US008259034B2

(12) United States Patent
Ichikawa et al.

(10) Patent No.: US 8,259,034 B2
(45) Date of Patent: Sep. 4, 2012

(54) IMAGE DISPLAYING APPARATUS AND IMAGE DISPLAY PROGRAM (75) Inventors: Katuhiro Ichikawa, Ichinomiya (JP);
Yoshie Kodera, Aichi (JP); Shigeo Hayashi, Nagano (JP); Tatumi Naganuma, Nagano (JP)

(73) Assignees: Totoku Electric Co., Ltd., Tokyo (JP);
National University Corporation Nagoya University, Aichi (JP)

( * ) Notice: Subject to any disclaimer, the term of this patent is extended or adjusted under 35 U.S.C. 154(b) by 860 days.

(21) Appl. No.: 12/309,095

(22) PCT Filed: Aug. 30, 2006

(86) PCT No.: PCT/JP2006/317041
§ 371 (c)(1),
(2), (4) Date: Jan. 6, 2009

(87) PCT Pub. No.: WO2008/026258
PCT Pub. Date: Mar. 6, 2008

(65) Prior Publication Data
US 2010/0045580 A1 Feb. 25, 2010

(51) Int. Cl.
*G09G 5/00* (2006.01)
(52) U.S. Cl. .......................... 345/3.3; 358/1.2
(58) Field of Classification Search .......... 345/3.3, 345/3.4, 698, 699; 358/1.2, 3.07
See application file for complete search history.

(56) References Cited

U.S. PATENT DOCUMENTS

| 5,214,519 A * | 5/1993 | Faulhaber et al. ............ 358/451 |
| 5,912,710 A * | 6/1999 | Fujimoto ...................... 348/445 |
| 7,844,168 B2 * | 11/2010 | Tsou et al. ................. 375/240.25 |

FOREIGN PATENT DOCUMENTS

| JP | 5-181962 | 7/1993 |
| JP | 9-244057 | 9/1997 |
| JP | 10-177373 | 6/1998 |
| JP | 10-327402 | 12/1998 |
| JP | 2003-228337 | 8/2003 |

* cited by examiner

*Primary Examiner* — Amare Mengistu
*Assistant Examiner* — Vinh Lam
(74) *Attorney, Agent, or Firm* — Jordan and Hamburg LLP (57) ABSTRACT An original monochrome image recorded with an FPD (flat panel detector) which comprises an array, m rows and n columns, of pixels is reduced and converted into a display image which comprises an array, q rows and (3*n*q/m) columns, of pixels before the display image is transferred to a monochrome liquid crystal display equipped with a monochrome LCD which comprises an array, q rows and P columns, of pixels, where m, n, q, and P are natural numbers and m≦n, q<P, n/m<P/q, and m>q are given. The monochrome liquid crystal display drives the three sub pixels of each pixel independently aligned along the row of the monochrome LCD to display the display image of the pixels in q rows and (3*n*q/m) columns.

4 Claims, 8 Drawing Sheets

IMAGE DISPLAYING APPARATUS AND IMAGE DISPLAY PROGRAM

FIELD OF THE INVENTION

The present invention relates to an image displaying apparatus and an image display program and more particularly to an image displaying apparatus and an image display program arranged for driving the sub pixels independently in its LCD (liquid crystal display) to improve the resolution along the major axis of the LCD and displaying a reduced image while maintaining the aspect ratio of an original image.

BACKGROUND OF THE INVENTION

An image reducing method is known for reducing a great number of pixels in an image through simple sampling or operation sampling to produce an image of a small number of pixels (See Patent Citation 1).

Meanwhile, a displaying apparatus is known which drives the three sub pixels of each pixel independently in its LCD (See Patent Citation 2).

Patent Citation 1: JP (Heisei)10-327402A
Patent Citation 2: JP 2003-228337A

There is a demand, for example, for displaying a medical image recorded with an FPD (flat panel detector) of 4096×3328 pixel type on an LCD of 1600×1200 pixel type.

Using the image reduction method of Patent Citation 1, a medical image of 4096×3328 pixels produced by the FPD is reduced to an image of 1477×1200 which can thus be displayed on the LCD of 1600×1200 pixel type. The number of pixels along the minor axis in the reduced image is set to 1200 because it corresponds to the number of pixels along the minor axis on the LCD. The number of pixels along the major axis in the reduced image is set to 1477 because the aspect ratio of the original image has to be maintained.

Since the original image along either of the major axis and the minor axis is reduced from 2.774 (=4096/1477/1200) pixels to one pixel for the LCD, its resolution will significantly be declined.

More specifically, it is essential for the diagnosis of breast cancer to identify a tiny pathological sign such as calcopherite of not greater than 100 μm. As the pitch of its pixels is generally 70 μm, the FPD has a desired degree of the resolution. However, since the pitch of pixels on LCD is equivalent to 194 (=70*2.774) μm of the pitch of pixels on the FPD, a desired degree of the resolution will hardly be maintained.

Each pixel on the LCD of the monochrome liquid crystal display consists of three sub pixels aligned along the major axis of the LCD. The resolution along the major axis on the LCD can thus be improved by driving independently the three sub pixels such as in the display of Patent Citation 2.

However, while the sub pixels are commonly rectangular in the shape, the image reducing method of Patent Citation 1 of which the shape of the pixels is square or circular fails to maintain the aspect ratio of the original image at the display.

SUMMARY OF THE INVENTION

It is hence an object of the present invention to provide an image displaying apparatus and an image display program arranged for driving the sub pixels independently in the LCD to improve the resolution along the major axis of the LCD and displaying a reduced image while maintaining the aspect ratio of an original image.

As a first aspect of the present invention, an image displaying apparatus is provided comprising: an image converting means for reducing and converting an original monochrome image which comprises an array, m rows and n columns, of pixels into a display image which comprises an array, q rows and (3*n*q/m) columns, of pixels where m, n, q, and P are natural numbers and m≦n, q<P, n/m<P/q, and m>q are given; and a monochrome liquid crystal display provided with a monochrome LCD, which comprises an array, q rows and P columns, of pixels for driving the sub pixels independently aligned along the rows of the monochrome LCD to display the display image on the LCD.

The image displaying apparatus of the first aspect reduces and converts the original monochrome image which comprises an array, m rows and n columns, of pixels into a display image which comprises an array, q rows and (3*n*q/m) columns, of pixels. As the number of pixels along the row of the original monochrome image is (n*q/m) at the aspect ratio (n/m), the number of pixels along the row in the display image is three times greater than that of the original monochrome image at the aspect ratio (n/m) of the original monochrome image. With the three sub pixels of each pixel on the monochrome LCD aligned along the row and driven independently to display the display image, the number of pixels along the row on the monochrome LCD is expressed by (3*n*q/m)/3= (n*q/m). Accordingly, the aspect ratio of the display image is (n*q/m)/q=(n/m). In other words, the aspect ratio of the original image can be maintained.

The resolution along the row is hence three times higher than that when the sub pixels are driven not independently. The pitch of the sub pixels on the LCD is equal at the conversion to n/(3*n*q/m)=m/(3*q) times greater than the pitch of the pixels on the FPD in view of the conversion into the pitch of pixels on the FPD. When the pitch of the pixels on the FPD is 70 μm with m=3328 and q=1200, for example, the pitch of the sub pixels on the LCD is equal to 65(=70*3328/(3*1200)) μm for the pitch of the pixels on the FPD in view of the conversion. Accordingly, the resolution of 100 μm needed for examining breast cancers can be achieved.

As a second aspect of the present invention, an image display program for displaying an original monochrome image which comprises an array, m rows and n columns, of pixels on a monochrome LCD, which comprises an array, q rows and P columns, of pixels, of a monochrome liquid crystal display where m, n, q, and P are natural numbers and m≦n, q<P, n/m<P/q, and m>q are given, is provided allowing a computer to act as an original monochrome image inputting means for inputting the original monochrome image from the outside, an image converting means for reducing and converting the original monochrome image into a display image which consists of an array, q rows and (3*n*q/m) columns, of pixels, and a display image outputting means for outputting the display image to the monochrome liquid crystal display in order to display the display image through independently driving the sub pixels of the monochrome LCD.

The image display program of the second aspect reduces and converts the original monochrome image which consists of comprises an array, m rows and n columns, of pixels into a display image which comprises an array, q rows and (3*n*q/m) columns, of pixels. As the number of pixels of the original monochrome image is (n*q/m) at the aspect ratio (n/m), the number of pixels along the row in the display image is three times greater than that of the original monochrome image. With the three sub pixels of each pixel on the monochrome LCD aligned along the row and driven independently to display the display image, the number of pixels along the row on the monochrome LCD is expressed by (3*n*q/m)/3=(n*q/ m). Accordingly, the aspect ratio of the display image is $(n*q/m)/q=(n/m)$. In other words, the aspect ratio of the original image can be maintained.

The resolution along the row is hence three times higher than that when the sub pixels are driven not independently. The pitch of the sub pixels on the LCD is equal to $n/(3*n*q/m)=m/(3*q)$ times greater than the pitch of the pixels on the FPD in view of the conversion into the pitch of pixels on the FPD. When the pitch of the pixels on the FPD is 70 μm with m=3328 and q=1200, for example, the pitch of the sub pixels on the LCD is equal to $65(=70*3328/(3*1200))$ μm for the pitch of the pixels on the FPD in view of the conversion. Accordingly, the resolution of 100 μm needed for examining breast cancers can be achieved.

ADVANTAGES OF THE INVENTION

The image displaying apparatus and the image display program according to the present invention allow the image to be reduced from an original image with the aspect ratio remaining unchanged and displayed on the LCD while the resolution along the major axis is improved.

The present invention will be described in more detail referring to one preferred embodiment shown in the relevant drawings. It would be understood that the present invention is not limited to the embodiments.

DESCRIPTION OF THE PREFERRED EMBODIMENTS

Figure 1:
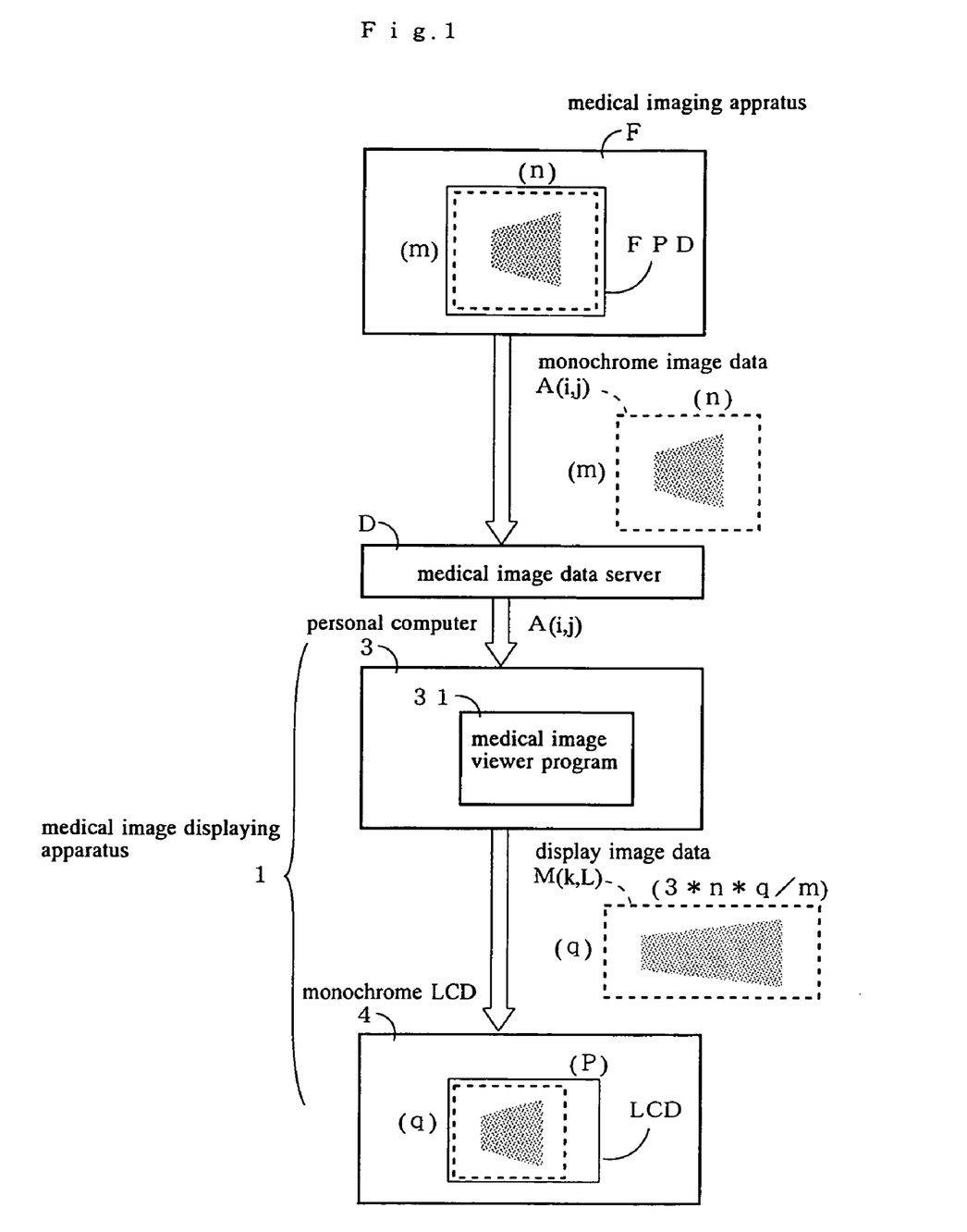
FIG. 1 is a schematic explanatory view of a medical image displaying apparatus showing Embodiment 1 of the present invention.

FIG. 1 is a schematic view of a medical image displaying apparatus 1 illustrating Embodiment 1.

The medical image displaying apparatus 1 comprises a personal computer 3 for carrying out a medical image viewer program 31 where, when $m \leq n$, $q<P$, $n/m<P/q$, and $m>q$ where m, n, q, and P are natural numbers, a monochrome medical image data A(i, j) which consists of an array, m rows and n columns, of pixels is entered and converted into a display image data M(k, L) which consists of a reduced array, q rows and $(3*n*q/m)$ columns, of pixels and a monochrome liquid crystal display 4 equipped with a monochrome LCD panel which is composed mainly of an array, q rows and P columns, of pixels for displaying the display image data M(k, L) through independently driving the sub pixels aligned along the rows of the monochrome LCD panel.

The monochrome medical image data A(i, j) has been recorded with an FPD in a medical imaging apparatus F which consists of an array, m rows and n columns, of pixels and saved in a medical image data server D.

When m>n, the major axis of the medical image data A(i, j) is commonly determined to extend along the up-and-down direction of a subject to be examined thus allowing the major axis of the LCD to extend along the up-and-down direction. It is however assumed for ease of the description that both the medical image data A(i, j) and the LCD are extended longer along the horizontal direction.

Figure 2:
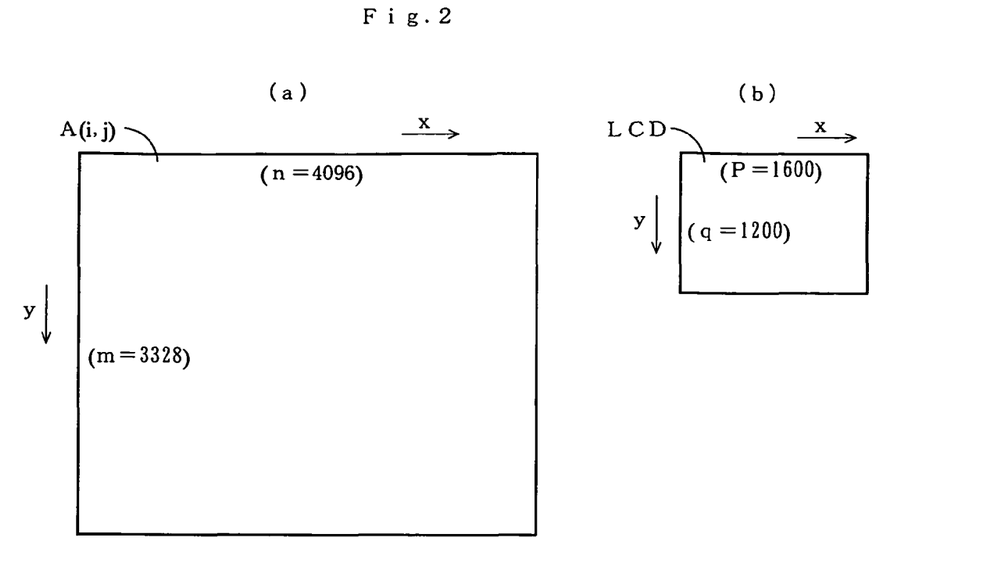
FIG. 2 is an explanatory view showing an array of pixels in a medical image data and an array of pixels on an LCD.

FIG. 2(a) illustrates a numerical example of the monochrome medical image data A(i, j) where m=3328 and n=4096.

FIG. 2(b) illustrates a numerical example of the LCD where q=1200 and P=1600.

Figure 3:
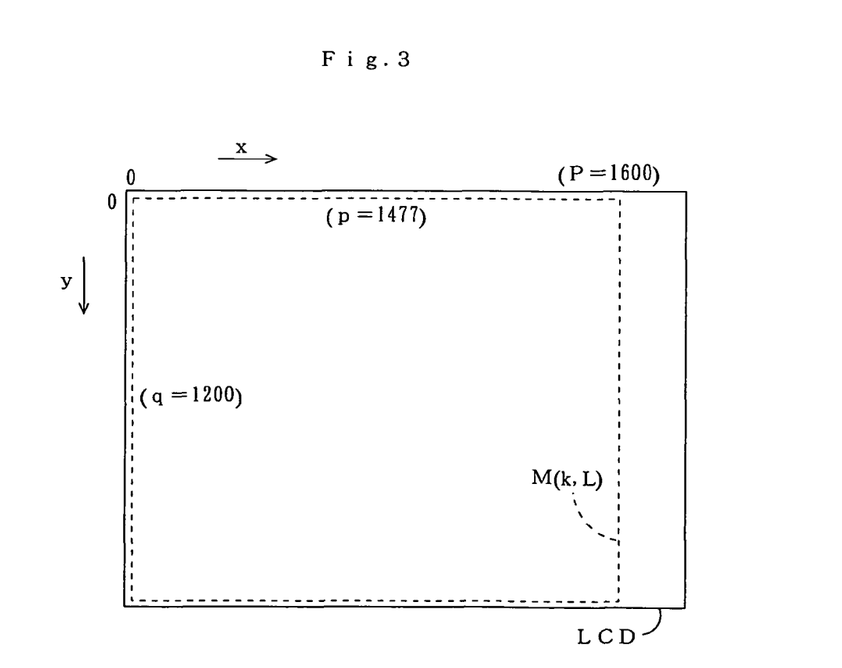
FIG. 3 is an explanatory view showing a reduced image on the LCD.

FIG. 3 is an explanatory view showing the relationship between the LCD and the display image data M(k, L).

As n/m<P/q is given, the monochrome medical image data A(i, j) is reduced so that the minor axis of the LCD extends along the minor axis of the display image data M(k, L). When the aspect ratio n/m of the monochrome medical image data A(i, j) is maintained, the number p of pixels along the major axis of the display image data M(k, L) becomes smaller than the number P of pixels along the major axis of the LCD.

For example, with m=3328, n=4096, q=1200, and P=1600, p=4096*1200/3328=1477 is established.

Figure 4:
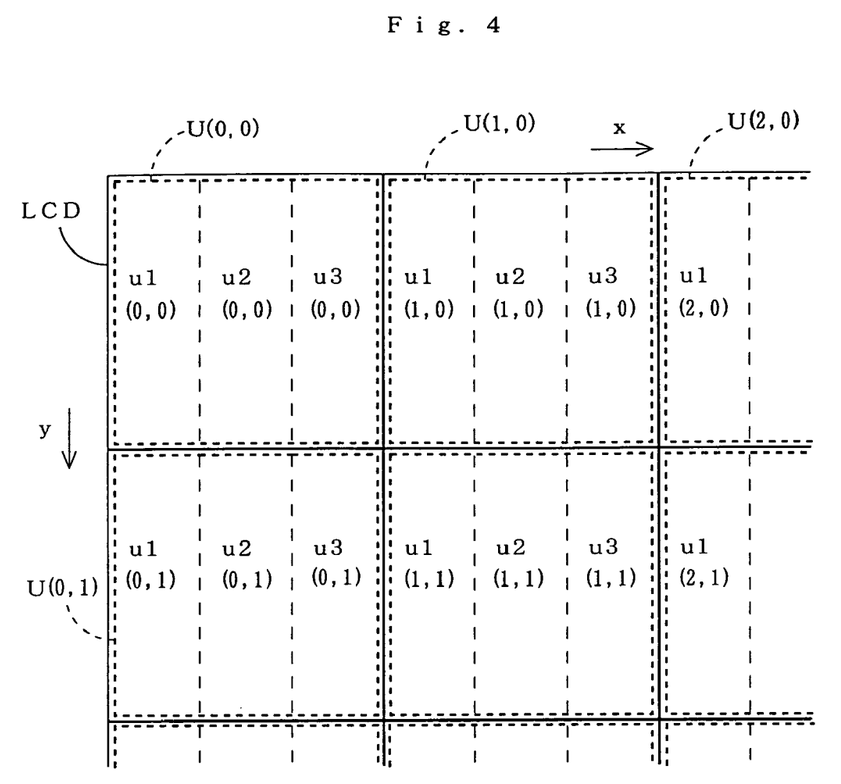
FIG. 4 is a partially enlarged view of sub pixels in the LCD.

As shown in FIG. 4, each pixel U in the LCD consists of three sub pixels u1, u2, and u3 aligned along the major axis of the LCD. Since the pixel U is arranged of a square shape, the shape of the sub pixels u1, u2, and u3 is rectangular.

Figure 5:
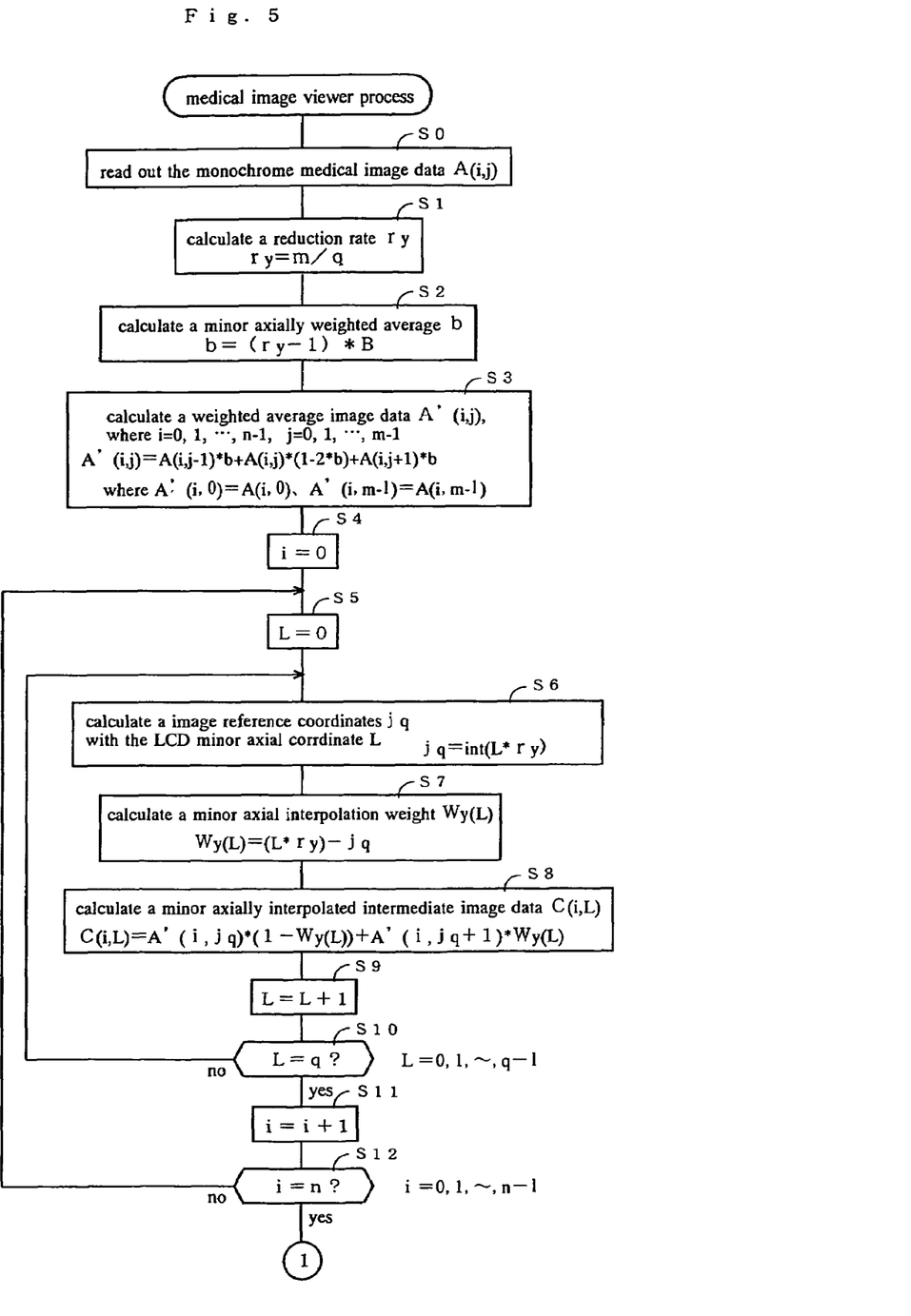
FIG. 5 is a flowchart of steps of a medical image viewer processing action according to Embodiment 1.
Figure 6:
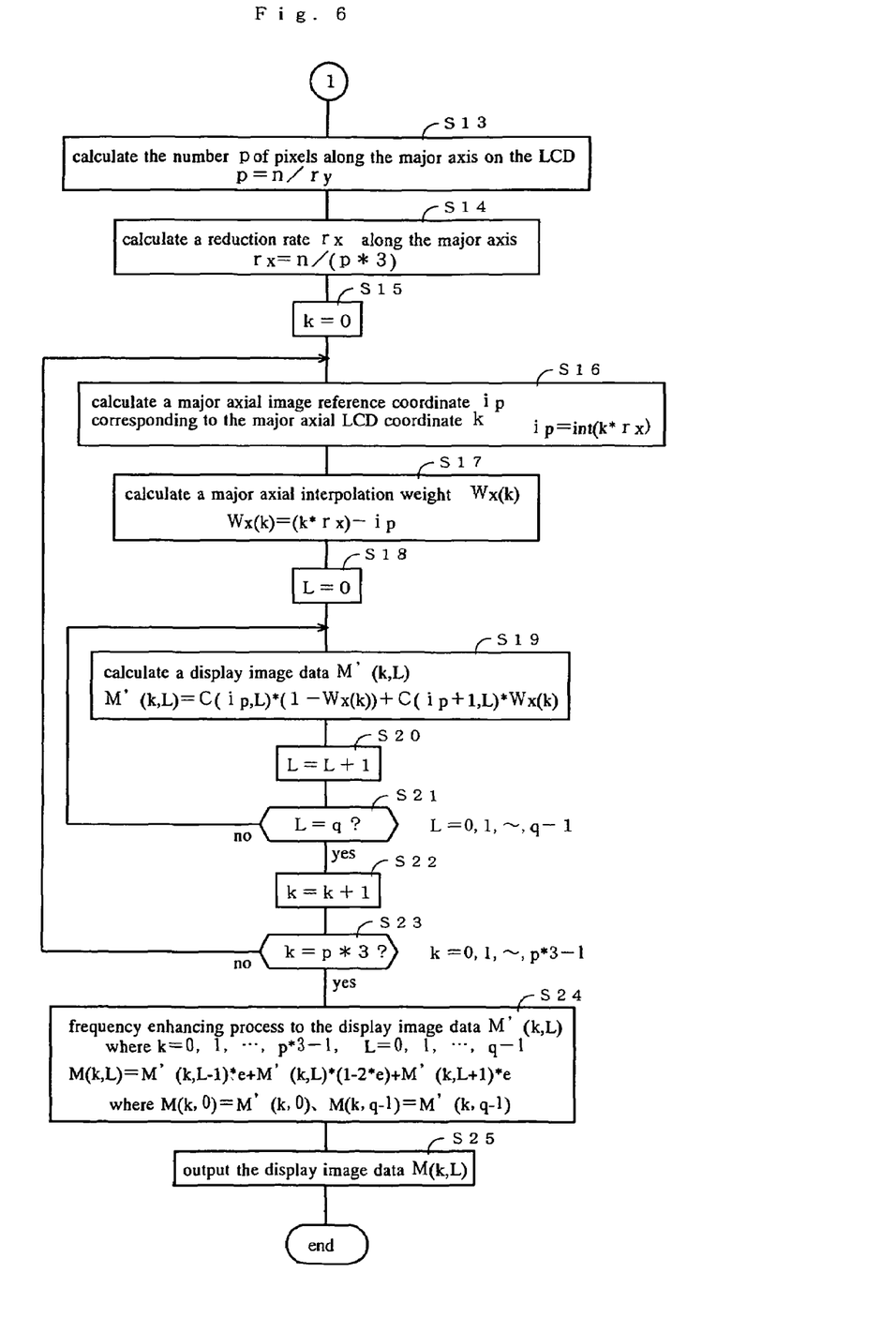
FIG. 6 is a flowchart following that of FIG. 5.

FIGS. 5 and 6 are flowcharts showing procedures of a medical image viewer process of the medical image view program 31 in the personal computer 3.

At Step S0, the monochrome medical image data A(i, j) comprising an array, m rows and n columns, of pixels is read out from the medical image data server 2.

At Step S1, a reduction rate ry=m/q along the minor axis is calculated from the number m of pixels along the minor axis of the monochrome medical image data A(i, j) and the number q of pixels along the minor axis on the LCD. For example, ry=2.774 is given with m=3328 and q=1200.

At Step S2, a minor axially weighted average weight b=(ry−1)*B is calculated from the reduction rate ry along the minor axis and an adjusting factor B. For example, b=0.2129 is given when ry=2.774 and B=0.12. This allows an operator to control the appearance (with image noises) of the display image through adjusting the adjusting factor B.

At Step S3, a weighted average image data A'(i, j) which is a result of weighted averaging the medical image data A(i, j) along the minor axis is calculated from the medical image data A(i, j) and the minor axially weighted average weight b so that all the pixels of the medical image data A(i, j) appear in the display image.

Figure 7:
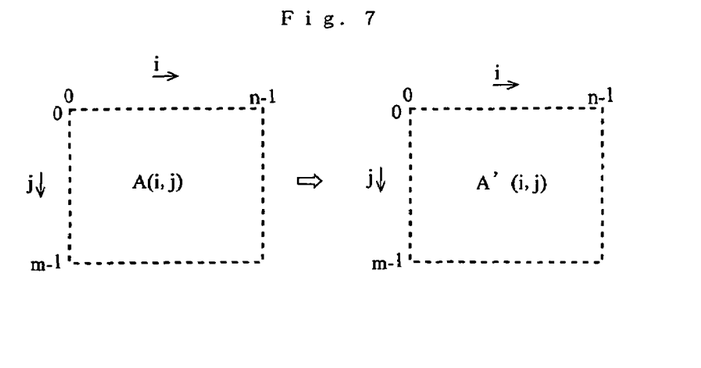
FIG. 7 is an explanatory view showing an array of pixels in a medical image data and an array of pixels in its minor axially weighted average image.

FIG. 7 illustrates structural concepts of the medical image data A(i, j) and the minor axially weighted average image data A'(i, j).

Figure 8:
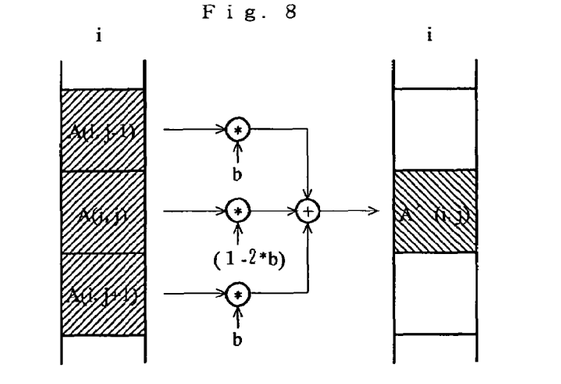
FIG. 8 is an explanatory view of an action of calculating the minor axially weighted average.

As apparent from FIG. 8 and the following equation, the minor axially weighted average image data A'(i, j) is calculated by weighted averaging the three adjacent medical image data A(i, j−1), A(i, j), and A(i, j+1), because the minimum integer which is greater than the reduction rate ry=2.774 along the minor axis is 3.

$$A'(i,j)=A(i,j-1)*b+A(i,j)*(1-2*b)+A(i,j+1)*b$$

where A'(i, 0)=A(i, 0) and A'(i, m−1)=A(i, m−1).

i=0, 1, . . . , n−1, j=0, 1, . . . , m−1.

In common, when the integer which is greater than the reduction rate ry along the minor axis is (2*g+1), the minor axially weighted average image data A'(i, j) is calculated by weighted averaging the adjacent medical image data A(i,j−g), . . . , A(i, j+g). The minor axially weighted average weight may be determined depending on g.

At Step S4, the image column coordinate i is initialized to zero.

At Step S5, the LCD minor axial coordinate L is initialized to zero.

At Step S6, an image reference coordinates jq=int(L*ry) along the minor axis is calculated with the LCD minor axial coordinate L.

At Step S7, a minor axial interpolation weight Wy(L)=(L*ry)−jq is calculated.

Figure 9:
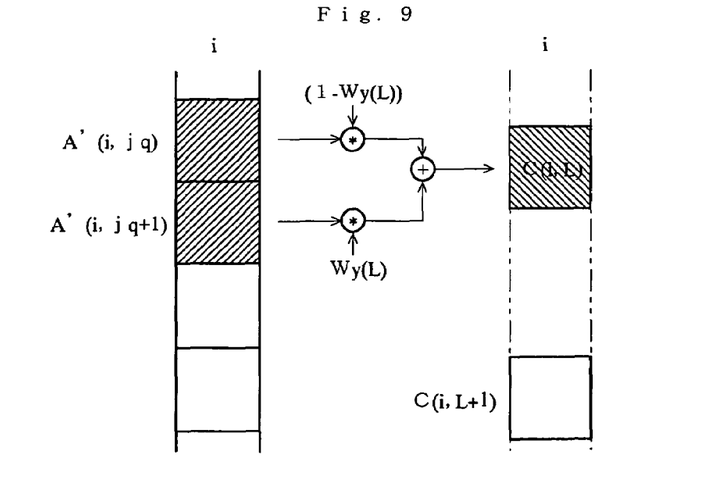
FIG. 9 is an explanatory view of a minor axially linear interpolating action.

At Step S8, a minor axially interpolated intermediate image data C(i, L) is calculated by linearly interpolating the minor axially weighted average image data A'(i, j) and the minor axial interpolation weight Wy(L) as shown in FIG. 9 and the following equation.

$$C(i,L)=A'(i,jq)*(1-Wy(L))+A'(i,jq+1)*Wy(L)$$

At Steps S9 and S10, the action at the steps S6 to S8 is repeated until L reaches (q−1).

At Steps S11 and S12, the action at the steps S5 to S10 is repeated until i reaches (n−1).

Figure 10:
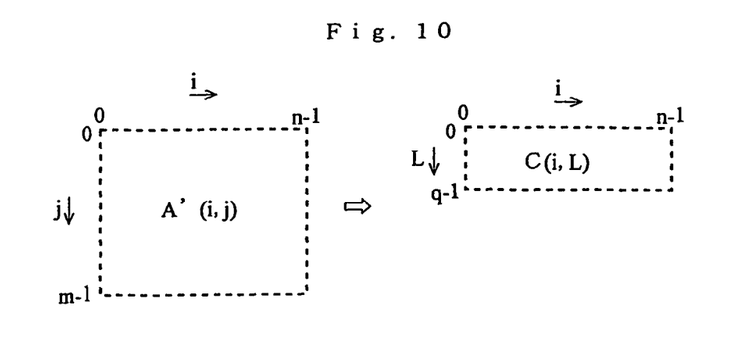
FIG. 10 is an explanatory view showing an array of pixels in the minor axially weighted average image and an array of pixels in its minor axially interpolated intermediate image.

As described and shown in FIG. 10, the minor axially weighted average image data A'(i, j) is converted into the minor axially interpolated intermediate image data C(i, L).

Referring to FIG. 6, at Step S13, the number p=n/ry of pixels along the major axis of the LCD used for actually displaying along the major axis on the LCD is calculated. For example, p=1477 is established when n=4096 and ry=2.774.

At Step S14, a reduction rate rx=n/(p*3) along the major axis is calculated from the number (p*3) of sub pixels which is a result of multiplying the number p of pixels by three for independently driving the three sub pixels along the major axis in each pixel of the LCD. For example, rx=0.9244 is established when n=4096 and p=1477.

At Step S15, the LCD major axial coordinate k is initialized to zero.

At Step S16, a major axial image reference coordinate ip=int(k*rx) corresponding to the major axial LCD coordinate k is calculated.

At Step S17, a major axial interpolation weight Wx(k)=(k*rx)−ip is calculated.

At Step S18, the LCD minor axial coordinate L is initialized to zero.

Figure 11:
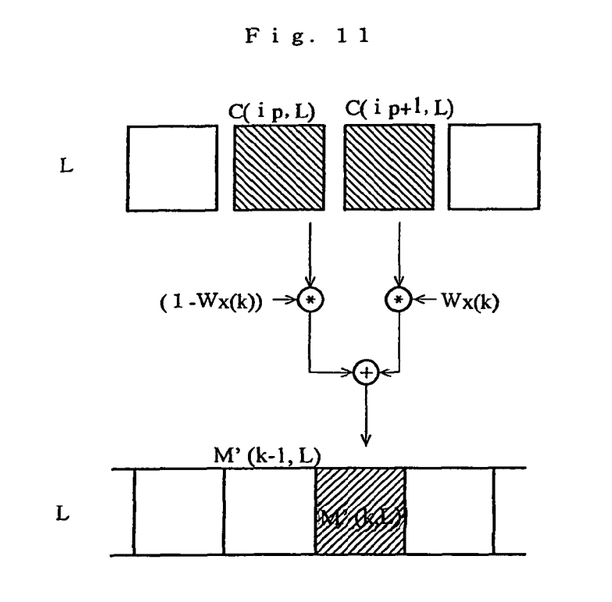
FIG. 11 is an explanatory view of a major axially linear interpolating action.

At Step S19, a display image data M'(k, L) is calculated by linearly interpolating the minor axially interpolated intermediate image data C(i, L) with the major axial interpolation weight Wx(k) as shown in FIG. 11 and the following equation.

$$M'(k,L)=C(ip,L)*(1-Wx(k))+C(ip+1,L)*Wx(k)$$

At Steps S20 and S21, the action at Step S19 is repeated until L reaches (q−1) before the procedure advances to Step S22.

Figure 12:
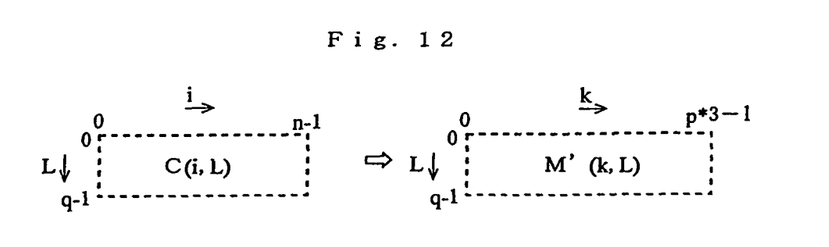
FIG. 12 is an explanatory view showing an array of pixels in the minor axially interpolated intermediate image and an array of pixels in the display image.

At Steps S22 and S23, the action at the steps S16 to S21 is repeated until k reaches (p*3−1) before the procedure advances to Step S24. Accordingly, as shown in FIG. 12, the display image data M'(k, L) is obtained.

Figures 13, 14:
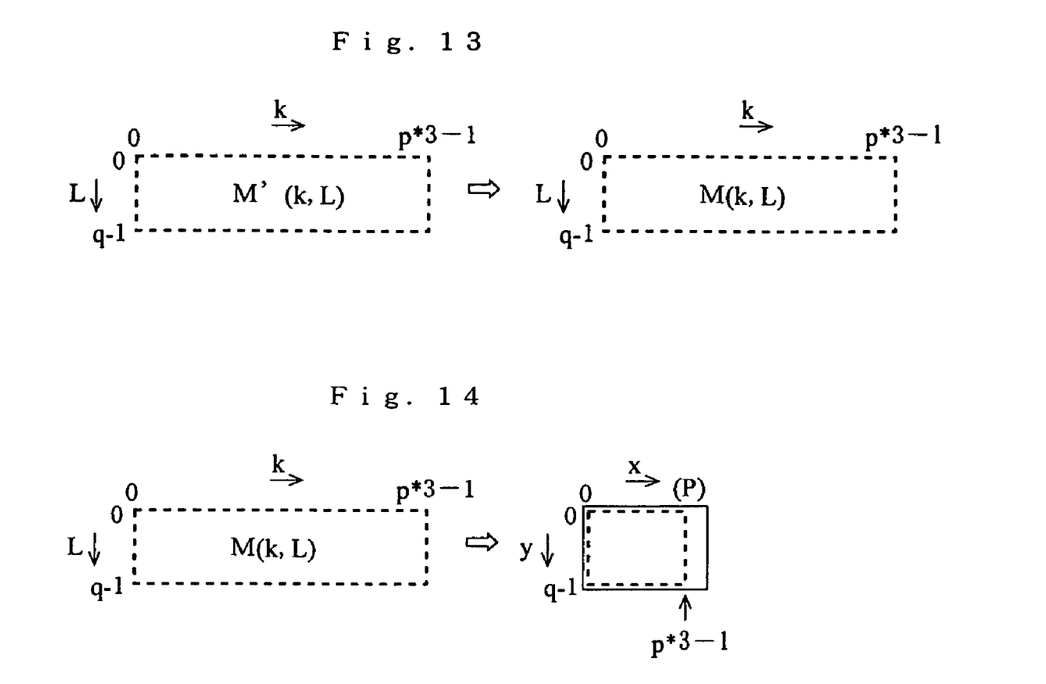
FIG. 13 is an explanatory view of an action of frequency enhancing the display image.
FIG. 14 is an explanatory view showing an array of pixels in the display image and its actual display on the display screen.

At Step S24, the display image data M'(k, L) is subjected to the frequency enhancing process by weighted calculation at three points for improving the resolution along the minor axis, thus calculating the final display image data M(k, L). Accordingly, the final display image data M(k, L) is obtained as shown in FIG. 13.

$$M(k,L)=M'(k,L-1)*e+M'(k,L)*(1-2*e)+M'(k,L+1)*e$$

where M(k, 0)=M'(k, 0), M(k, q−1)=M'(k, q−1), k=0, 1, . . . , p*3−1 and L=0, 1, . . . , q−1. Also, e is a weighted factor for use in the frequency enhancing process as ranging, for example, from −0.1 to −0.2 in view of the balance with the direction of the major axis and the impression of a displayed image.

At Step S25, the display image data M(k, L) is transferred from the personal computer 3 to the monochrome liquid crystal display 4.

The monochrome liquid crystal display 4 drives the sub pixels of the LCD independently to display the display image data M(k, L) as shown in FIG. 14.

The advantages of the medical image displaying apparatus 1 with the medical image viewer program 31 of Embodiment 1 are as follows.

(1) The number of the sub pixels along the major axis of the LCD to be actually used for display is (p*3) which is equivalent to the number (n*q/m) of the pixels in view of the conversion into the number of pixels. Accordingly, the aspect ratio of the display image is expressed by (n*q/m)/q=(n/m). More particularly, the aspect ratio of the medical image data A(i, j) can be maintained.

(2) The resolution along the major axis is three times greater than that when the sub pixels are driven not independently. The pitch of the sub pixels on the LCD is equal at the conversion to n/(3*n*q/m)=m/(3*q) times greater than the pitch of the pixels on the FPD in view of the conversion into the pitch of pixels on the FPD. For example, when the pitch of the pixels on the FPD is 70 μm with m=3328 and q=1200, the pitch of the sub pixels on the LCD is equal to 65 (=70*3328/(3*1200)) μm for the pitch of the pixels on the FPD in view of the conversion. Accordingly, the resolution of 100 μm needed for examining breast cancers can be achieved.

The image displaying apparatus and the image display program according to the present invention can favorably be used for increasing the efficiency of the action of doctors examining various medical photos including X-ray images, CT images, and MR images for diagnostic purposes.

Description Of Numerals

1: Medical image displaying apparatus, 3: Personal computer, 4: Monochrome liquid crystal display, 31: Medical image viewer program.

What is claimed is:

1. An image displaying apparatus comprising:
an image converting means for converting an original monochrome image which comprises an array, m rows and n columns, of pixels into a display image which comprises an array, q rows and (3*n*q/m) columns, of pixels where m, n, q, and P are natural numbers and m≦n, q<P, n/m<P/q, and m>q are given; and
a monochrome liquid crystal display provided with a monochrome LCD comprising an array, q rows and P columns, of pixels for driving the sub pixels independently aligned along the row of the monochrome LCD to display the display image on the LCD.

2. An image display program for displaying an original monochrome image which comprises an array, m rows and n columns, of pixels on a monochrome LCD of a monochrome liquid crystal display which comprises an array, q rows and P columns, of pixels where m, n, q, and P are natural numbers and $m \leq n$, $q<P$, $n/m<P/q$, and $m>q$ are given, allowing a computer to act as:

an original monochrome image inputting means for inputting the original monochrome image from the outside;

an image converting means for converting the original monochrome image into a display image which comprises an array, q rows and $(3*n*q/m)$ columns, of pixels; and a display image outputting means for outputting the display image to the monochrome liquid crystal display in order to display the display image through independently driving the sub pixels of the monochrome LCD.

3. An image displaying apparatus according to claim 1, wherein:

the image converting means comprises:

a means for, when i is a coordinate along one row and j is a coordinate along one column, calculating a reduction rate $ry=m/q$ along the column from the number m of pixels along the column of an original image $A(i, j)$ and the number q of pixels along the column on the LCD;

a means for calculating a column directionally weighted average weight $b=(ry-1)*B$ from the reduction rate ry along the column and a predetermined adjusting factor B;

a means for calculating a column directionally weighted average image $A'(i, j)$ by weighted averaging the original image $A(i, j)$ along the columns with the column directionally weighted average weight b so that all the pixels of the original image $A(i, j)$ appear on the display image;

a means for calculating an image reference column directional coordinate $jq=int(L*ry)$ which corresponds to the column directional coordinate L on the LCD;

a means for calculating a column directional interpolation weight $Wy(L)=(L*ry)-jq$;

a means for calculating a column directionally interpolated intermediate image $C(i, L)$ by linearly interpolating the column directionally weighted average image $A'(i, j)$ with the column directional interpolation weight $Wy(L)$;

a means for calculating a number $p=n/ry$ of pixels along the row on the LCD which are actually used for display along the row on the LCD;

a means for calculating a reduction rate $rx=n/(p*3)$ along the row from the number $(p*3)$ of sub pixels which is equal to three times the number p of the pixels;

a means for calculating an image reference row directional coordinate $ip=int(k*rx)$ which corresponds to the row directional coordinate k on the LCD;

a means for calculating a row directional interpolation weight $Wx(k)=(k*rx)-ip$;

a means for calculating a display image $M'(k, L)$ by linearly interpolating the column directionally interpolated intermediate image $C(i, L)$ with the row directional interpolation weight $Wx(k)$; and a means for subjecting the display image $M'(k, L)$ to a frequency enhancing processing action to obtain a final display image $M(k, L)$.

4. An image display program according to claim 2, wherein:

the image converting means comprises the steps of:

calculating, when i is a coordinate along one row and j is a coordinate along one column, a reduction rate $ry=m/q$ along the column from the number m of pixels along the column of an original image $A(i, j)$ and the number q of pixels along the column on the LCD;

calculating a column directionally weighted average weight $b=(ry-1)*B$ from the reduction rate ry along the column and a predetermined adjusting factor B;

calculating a column directionally weighted average image $A'(i, j)$ by weighted averaging the original image $A(i, j)$ along the columns with the column directionally weighted average weight b so that all the pixels of the original image $A(i, j)$ appear on the display image;

calculating an image reference column directional coordinate $jq=int(L*ry)$ which corresponds to the column directional coordinate L on the LCD;

calculating a column directional interpolation weight $Wy(L)=(L*ry)-jq$;

calculating a column directionally interpolated intermediate image $C(i, L)$ by linearly interpolating the column directionally weighted average image $A'(i, j)$ with the column directional interpolation weight $Wy(L)$;

calculating a number $p=n/ry$ of pixels along the row on the LCD which are actually used for display along the row on the LCD;

calculating a reduction rate $rx=n/(p*3)$ along the row from the number $(p*3)$ of sub pixels which is equal to three times the number p of the pixels;

calculating an image reference row directional coordinate $ip=int(k*rx)$ which corresponds to the row directional coordinate k on the LCD;

calculating a row directional interpolation weight $Wx(k)=(k*rx)-ip$;

calculating a display image $M'(k, L)$ by linearly interpolating the column directionally interpolated intermediate image $C(i, L)$ with the row directional interpolation weight $Wx(k)$; and subjecting the display image $M'(k, L)$ to a frequency enhancing processing action to obtain a final display image $M(k, L)$.

* * * * *